Sept. 11, 1951          O. H. LIND          2,567,386
BRACKET FOR SUPPORTING CABLES OR PIPES
Filed Nov. 30, 1946
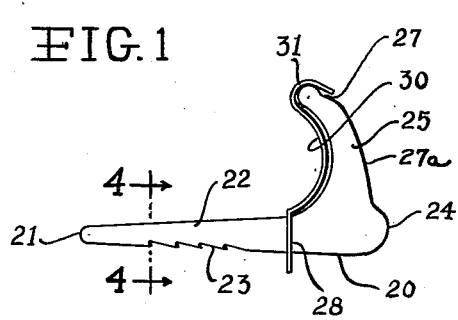
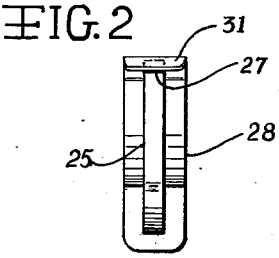
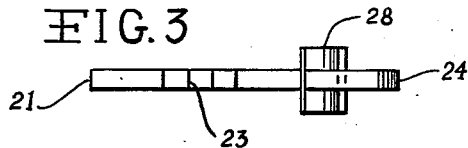
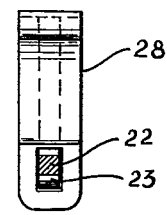
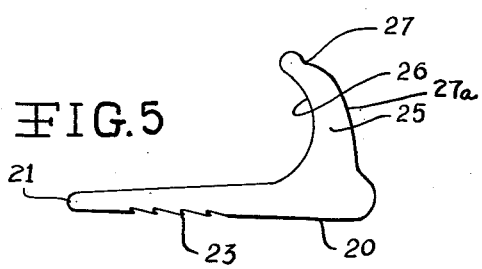
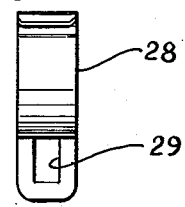
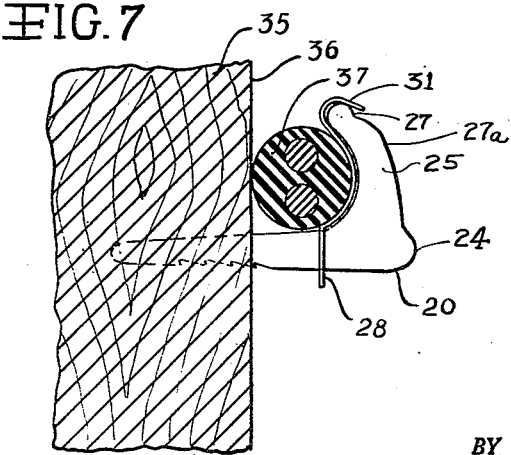
INVENTOR.
Otto H. Lind
BY
HIS ATTORNEYS Patented Sept. 11, 1951

2,567,386

UNITED STATES PATENT OFFICE 2,567,386

BRACKET FOR SUPPORTING CABLES OR PIPES

Otto H. Lind, Cincinnati, Ohio

Application November 30, 1946, Serial No. 713,199

5 Claims. (Cl. 248—71)

1

This invention relates to improvements in brackets for supporting conduits, such as cables or pipes against a wall, and more particularly pertains to the type of bracket having a wall-penetrating shank ending in an object embracing hook which is fitted with a guard plate curved against the object engaging surface of the hook, thus presenting a wide surface to bear against the supported object, to prevent the cutting or crushing of it.

This bracket is designed for use, particularly, in fastening pipe conduits or cables against a wall, without endangering the conduit or cable when hammering the bracket into the wall. Electric conductors carried by pipes and cables are particularly susceptible to short circuiting when unduly crushed or chafed. Protection against crushing, cutting, or chafing is given by providing a novel guard plate, of extra width, which slips over the shank end of the bracket and nests with the inner curved object engaging surface of the hook to extend along its length and project laterally on each side thereof. Such a wall penetrating type of bracket is ordinarily made with the shank and arm of relatively small cross section so that easy penetration of the wall may be accomplished and my novel guard plate overcomes the disadvantages of such dimensions without any special forming operation being required for widening the hook.

In fastening rather fragile cables and pipes with such brackets, danger of damage to them, by cutting, crushing, or chafing is always present. This is true not only of electrical conduits and cables, but of glass, plastic resin, copper or lead tubes for conveying liquids or gases.

By increasing the width of the engaging face of the hook such danger is reduced by reason of the increase of the bearing surface. I provide a two piece bracket having a wide engaging surface to bear against the supported object. Because each of the two pieces, the wall penetrating and hook member, and the wide guard plate member, may be cut from sheet metal stock and the plate easily bent and punched to form, I provide a cheaply made bracket by avoiding casting, forging, or complicated forming and cutting operations.

Inasmuch as the two pieces of the bracket are assembled together by having the shank of the wall penetrating member pierce a hole in the guard plate member, I provide a novel construction whereby the two pieces are automatically clamped together, by a resilient spring-like coupling, to prevent separation of the pieces during ordinary handling by the workmen.

Therefore, the principal object of the invention is to provide a bracket for holding objects against a wall, said bracket affording a wide object engaging surface, facing the object to be held, as compared with the width of wall penetrating and hook parts of the bracket.

Another object of the invention is to provide a wall penetrating hook type of bracket for use in holding cylindrical objects against a wall, said bracket affording a wide object engaging surface.

Another object of the invention is to provide such a bracket wherein the wall penetrating portion is cut from a plate of metal so as to provide on its other end a hook, and to provide a bent pierced plate which fits over the wall penetrating member and against the object engaging surface of the hook, to enlarge the effective bearing surface thereof.

Another object of the invention is to provide such a two piece bracket which is easily assembled, and wherein the guard plate may be interlocked with the wall penetrating member by a resilient snap coupling, so that the two pieces will stay together during ordinary handling.

Another object of the invention is to provide a hook type of wall penetrating bracket, intended to be pounded into and held in a wall, said bracket having, extending from the wall after being pounded in, a curved object engaging surface on the inner side of the hook, which surface engages the object, to be held, between it and the wall, and said hook being provided with a plate nesting against the inner surface to afford a large bearing surface to prevent injury to the supported object.

Another object of the invention is to provide such a bracket with toothed edges on the wall penetrating portion thereof, to help hold the bracket in the wall.

Further objects, and objects relating to details and economies of operation, will definitely appear from the detailed description to follow. In one instance, the objects of my invention have been accomplished by the devices and means set forth in the following specification. The invention is clearly defined and pointed out in the appended claims. Structures constituting the preferred embodiment of the invention, are illustrated in the accompanying drawings, forming a part of this specification, in which:

Fig. 1 is a side elevation of my novel device;

Fig. 2 is an end elevation of my novel device as looked at from the hammering end;

Fig. 3 is a top plan view of my novel device;

Fig. 4 is a sectional view of part of the substance of Fig. 1, looking in the direction of the arrows on the line 4—4 thereof;

Fig. 5 is a view of the substance of Fig. 1 with guard plate removed therefrom;

Fig. 6 is an elevation of the guard plate, removed from the wall penetrating member, showing the curved surface of the guard plate which engages the internal curved surface of the hook;

Fig. 7 shows the novel bracket in use for holding an electric cable against a wall.

I prefer to make my brackets of sheet steel, or other hard material, and I preferably would have them made of rust and corrosion resisting steel, or steel coated, as by electro-plating, with a rust resisting substance such as cadmium. In making such brackets out of steel, for use in building construction using standard sizes of cables, conduits and pipes associated with residential work, I propose that the wall penetrating member be stamped out of sheet steel of between $\frac{3}{32}$ of an inch and $\frac{1}{8}$ of an inch in thickness. The guard plate material may be stamped out of sheet steel of about $\frac{1}{64}$ of an inch in thickness. The long dimension of the wall penetrating member from the wall penetrating end to the hammering end should be about 2¼ inches, and the hook extending laterally from the wall penetrating member should have a concave edge surface, facing the wall penetrating end of the shank, which has a radius of curvature of about $\frac{7}{16}$ of an inch, extending in an arc of slightly less than half of a circle. It is to be understood that the dimensions I have given are not to be deemed critical but are suggested only as those found to give a bracket of widest utility in the building trades.

Referring to the drawings, wherein the same parts in the several views are given the same reference numerals, there is shown the wall penetrating member 20, having a blunt point penetrating end 21, and a tapered penetrating shank 22 provided on its lower edge with backwardly slanting teeth 23. On the end of member 20, opposite to the penetrating end, is a head 24 on which a hammer may be used to drive the member into a wall. Extending laterally from the shank is a curved arm 25, having an internally curved surface 26, forming a concave embracing arm adapted to cooperate with a cylindrical object. On the outer curvature 27a of the arm, is formed a notch 27, provided for snap coupling the guard plate, to be described, to the member 20. The wall penetrating member, shown by itself in Fig. 5, is fitted with a guard plate 28 shown in Figs. 1, 2, 3, 4, 6 and 7. The guard plate, as has been mentioned, is stamped from a piece of metal plate stock which is relatively thin in comparison with the thickness of the wall penetrating member 20, and its lower end as shown in Fig. 6, is provided with a rectangular hole 29 which admits the tapered end 22, of the shank, to about the place where the inner curvature of the hook arm begins, being formed at that place to fit the curvature. The upper end of the guard plate 28 is curved as at 30 (Fig. 1) to correspond with the concave inner curvature of the hook arm 25, and, at the tip end, the guard plate is reversely curved as at 31, sufficiently, to snap fit into the notch 27 so that the plate will not easily become disengaged from the wall penetrating member 20 after having been once assembled thereon. It will be seen in Figs. 2 and 4, that the guard plate is several times the width of the wall penetrating member and affords a large bearing area, compared with what would be afforded by the bare hook arm surface 26, to engage the object to be held.

The novel bracket of this invention is shown, in use, in Fig. 7, as driven into a wooden object 35 having a wall surface 36, to hold an electric cable 37, supported between the guard plate and the wall.

While the novel bracket is adapted to be driven directly into objects made of wood, the bracket is also adapted to be used in concrete by first boring a hole of proper diameter so that the tapered shank may be wedged and cramped therein.

From what has been said as to the construction of my novel device, it will be understood that it may be made by punching and bending operations performed on flat plate stock material and hence is cheap to make.

I am aware that the device shown herein may be varied considerably without departing from the spirit of my invention and, therefore, I claim my invention broadly as indicated by the appended claims.

Having thus described my invention, what I claim as new and useful and desire to secure by Letters Patent, is:

1. A hooked bracket for a conduit, including, in combination, a wall penetrating member having a non-circular tapered shank on one end, a driving head on the other end, and a hook arm extending sidewardly from the driving head end of the shank, said arm having a concave curved surface facing the tapered end of the shank; and a wide easily bent resilient guard plate having a hole in one end through its thickness conforming to the cross section of the shank, which plate embraces the shank of the penetrating member, by means of said hole, near the arm thereof, and the other end of the plate being bent back to resiliently engage the end of the hook arm for holding said guard seated against said arm.

2. A hooked bracket for a conduit, including, in combination, a metal wall penetrating member having a non-circular tapered shank on one end, a driving head on the other end, and an arm extending sidewardly from the driving head end of the shank, said arm having a concave curved surface facing the tapered end of the shank and a notch on the convex surface near the tip; and a wide easily bent resilient sheet metal guard plate having a hole in one end through its thickness conforming to the cross section of the shank, which plate embraces the shank of the penetrating member, by means of said hole, near the arm thereof, and the other end of the plate curving with one flat surface against the concave curved surface of the arm and presenting its oppositely curved surface for engagement with a conduit, said plate being reversely curved around the end of the arm to terminate in a spring edge for resiliently engaging the notch, whereby the plate is held onto the penetrating member.

3. A hooked bracket for a conduit, including, in combination, a metal wall penetrating member having a tapered shank on one end, a driving head on the other end, and an arm extending sidewardly from the driving head end of the shank, said arm having a concave curved surface facing the tapered end of the shank; and a wide easily bent resilient metal guard plate having a hole in one end through its thickness conforming to the cross section of the shank, which plate embraces the shank of the penetrating member, by means of the hole, near the arm thereof, and the other end of the plate curving with one flat surface against the concave curved surface of the arm its full extent, and reversely curved to have its free edge sprung over the end of the arm for holding it in place.

4. A hooked bracket for holding a cylindrical object against the wall, including, in combination, a wall penetrating member having a tapered shank on one end for penetrating a wall, a driving head on the other end, and an arm extending sidewardly from the driving head end of the shank, said arm having a concave curved surface facing the tapered end of the shank, said penetrating member being cut from a flat metal plate, the arm and shank lying in the plane of the plate; and a wide easily bent resilient guard plate, made of metal, having a hole in one end through its thickness for receiving the shank of the penetrating member and having its opposite end bent to provide a snap fit with the free end of the sidewardly extending arm.

5. A conduit clamp comprising in combination a wall penetrating member having a non-circular shank on one end, a driving head on the other end, a hook arm extending sidewardly from the driving head end of the shank said arm having a concave curved surface facing the shank, and a guard plate of easily bent resilient material, extending over the concave surface of the hook arm, substantially wider than the curved surface of the arm, having a hole in one end through its thickness conforming to the cross section of the shank for non-rotatably fitting said end to the shank and having its opposite end bent back for resiliently engaging the end of the hook arm.

OTTO H. LIND.

REFERENCES CITED

The following references are of record in the file of this patent:

UNITED STATES PATENTS

| Number | Name | Date |
|---|---|---|
| 271,825 | Fiske | Feb. 6, 1883 |
| 911,877 | Iwan | Feb. 9, 1909 |
| 1,365,629 | Lieb | Jan. 11, 1921 |
| 1,529,881 | Engle | Mar. 17, 1925 |
| 1,888,265 | Guthrie | Nov. 22, 1932 |